US010208889B2

(12) United States Patent
Jaggard et al.

(10) Patent No.: US 10,208,889 B2
(45) Date of Patent: Feb. 19, 2019

(54) COLLAPSIBLE THREE LEGGED PLATFORM

(71) Applicants: Steve Jaggard, Houston, TX (US); Hunter R. Jaggard, Katy, TX (US); Griffin T. Jaggard, Katy, TX (US); Stephen Dunn, Houston, TX (US)

(72) Inventors: Steve Jaggard, Houston, TX (US); Hunter R. Jaggard, Katy, TX (US); Griffin T. Jaggard, Katy, TX (US); Stephen Dunn, Houston, TX (US)

(73) Assignee: TCG Partners, LLC—Intellectual Property Series, Houston, TX (US)

( * ) Notice: Subject to any disclaimer, the term of this patent is extended or adjusted under 35 U.S.C. 154(b) by 26 days.

(21) Appl. No.: 15/607,659

(22) Filed: May 29, 2017

(65) Prior Publication Data
US 2018/0340647 A1  Nov. 29, 2018

(51) Int. Cl.
*F16M 11/24* (2006.01)
*A47J 37/07* (2006.01)
*F24C 3/14* (2006.01)

(52) U.S. Cl.
CPC ........ *F16M 11/242* (2013.01); *A47J 37/0763* (2013.01); *F24C 3/14* (2013.01)

(58) Field of Classification Search
CPC ....... F16M 11/242; F24C 3/14; A47J 37/0763
USPC .. 248/165–167, 170, 188.6, 188.7, 435, 434
See application file for complete search history.

(56) References Cited

U.S. PATENT DOCUMENTS

| | | | | | |
|---|---|---|---|---|---|
| 163,202 | A | * | 5/1875 | Houston | F24C 3/14 126/38 |
| 1,060,861 | A | * | 5/1913 | Schulte | F16M 11/22 248/167 |
| 1,096,185 | A | * | 5/1914 | Nelson | F24C 3/14 126/246 |
| 1,931,714 | A | * | 10/1933 | Authur | A47J 36/34 248/167 |
| 1,979,843 | A | * | 11/1934 | Roos | A47B 3/12 108/115 |
| 2,706,609 | A | * | 4/1955 | Sullivan | B65G 13/12 211/151 |
| 4,177,790 | A | * | 12/1979 | Zenzaburo | F24C 3/14 126/38 |
| 4,288,052 | A | * | 9/1981 | Scott | F16M 11/38 248/158 |
| 4,377,269 | A | * | 3/1983 | Sellner | F16M 11/10 248/188.6 |
| 4,454,859 | A | * | 6/1984 | Vincent | F24C 1/16 126/38 |
| 5,022,620 | A | * | 6/1991 | Scott | A47F 5/04 248/167 |
| 5,117,808 | A | * | 6/1992 | Peters | F24C 3/14 126/25 R |
| D342,694 | S | * | 12/1993 | Frost | D11/130.1 |
| 5,868,126 | A | * | 2/1999 | Long | F16L 37/252 126/25 R |

(Continued)

FOREIGN PATENT DOCUMENTS

FR          627895 A * 10/1927 ............ F16M 11/30

*Primary Examiner* — Eret C McNichols
(74) *Attorney, Agent, or Firm* — Dossey & Jones, PLLC; Phillip Black; James P. Dossey

(57) ABSTRACT

A collapsible three-legged platform is provided. The three legs are attached at a central pivot point such that the platform can collapse flat. The legs can be adapted to support a variety of objects.

3 Claims, 6 Drawing Sheets

(56) References Cited

U.S. PATENT DOCUMENTS

| | | | | |
|---|---|---|---|---|
| 5,871,185 A * | 2/1999 | Phillips | ............... | F16M 11/16 |
| | | | | 248/165 |
| 5,884,553 A * | 3/1999 | Morris | ............... | A47J 36/24 |
| | | | | 126/25 R |
| 6,138,977 A * | 10/2000 | Tsai | ............... | A47G 33/12 |
| | | | | 248/523 |
| 6,688,565 B1 * | 2/2004 | Chen | ............... | F16M 11/16 |
| | | | | 248/166 |
| 7,775,203 B1 * | 8/2010 | Patrick | ............... | F24C 3/14 |
| | | | | 126/38 |
| 8,109,476 B2 * | 2/2012 | Roberts | ............... | B65B 67/1205 |
| | | | | 248/100 |
| 9,161,647 B2 * | 10/2015 | Leung | ............... | A47G 33/1206 |
| 9,243,737 B2 * | 1/2016 | Hida | ............... | F16M 11/04 |
| 9,383,111 B2 * | 7/2016 | Nelson, Sr. | ............... | A47J 36/26 |
| 2008/0169389 A1 * | 7/2008 | Hill | ............... | F16M 11/22 |
| | | | | 248/166 |
| 2014/0290640 A1 * | 10/2014 | Kim | ............... | F24C 3/14 |
| | | | | 126/38 |
| 2015/0159802 A1 * | 6/2015 | Johnson | ............... | E04H 12/2238 |
| | | | | 248/165 |
| 2018/0112882 A1 * | 4/2018 | Fleming | ............... | F24C 3/14 |
| 2018/0184844 A1 * | 7/2018 | Hagstrom | ............... | A47J 37/0763 |

\* cited by examiner

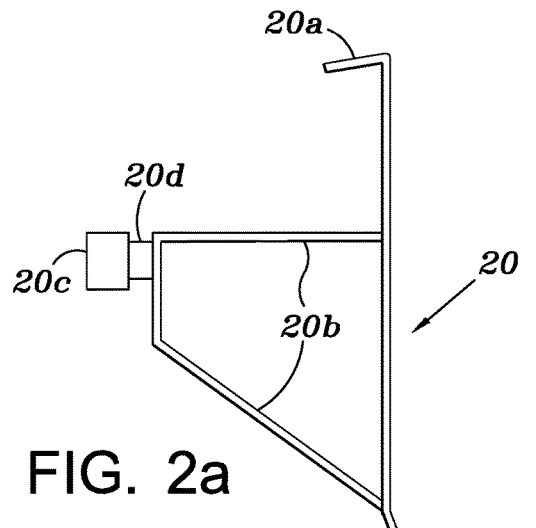
FIG. 2a
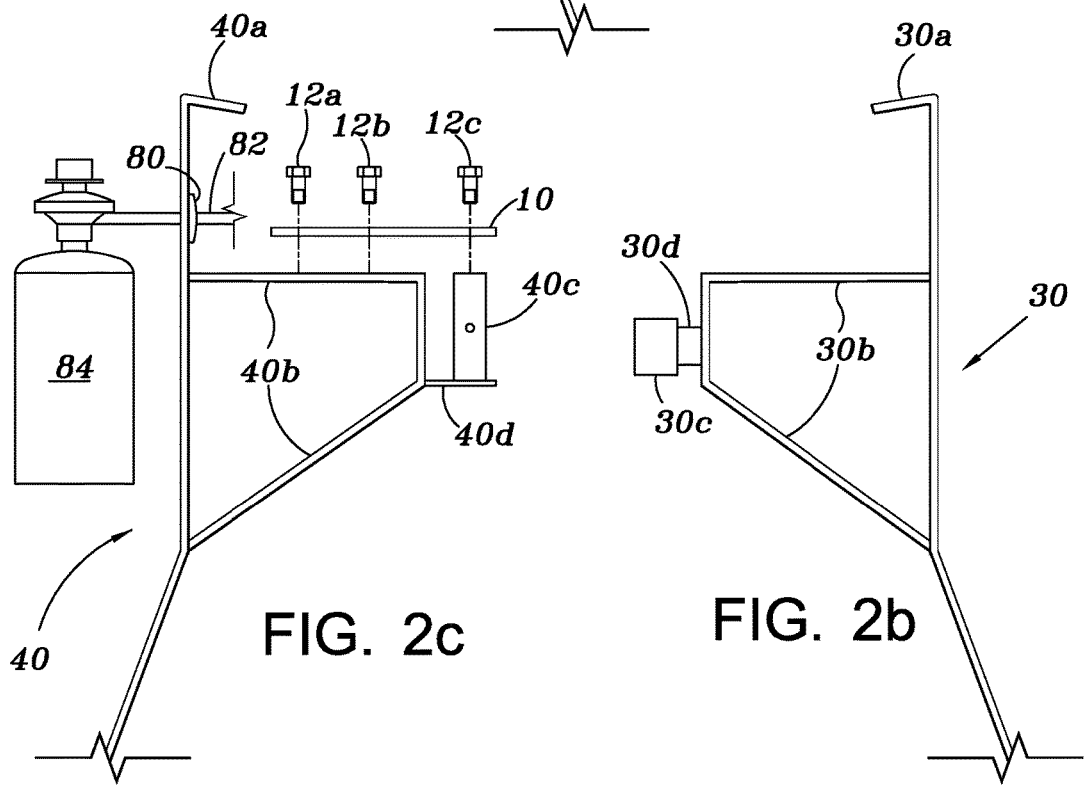
FIG. 2c
FIG. 2b

COLLAPSIBLE THREE LEGGED PLATFORM

CONTINUATION IN PART

This application is a continuation in part of, and priority is hereby claimed to, U.S. patent application having the application Ser. No. 14/522,070, filed on Oct. 23, 2014. Accordingly, all disclosures made in the Ser. No. 14/522,070 application are hereby incorporated by reference.

BACKGROUND OF INVENTION

Field of the Invention

This invention relates to a collapsible platform for securely supporting an object, for example, a wok. More particularly, a collapsible three-legged platform assembly pivotally secured together in such a way to enable the assembly to collapse for easy transport is disclosed.

Description of Related Art

Platforms for supporting objects are used in a variety of settings. For example, platforms may be used as a base for a table, chairs, or barbeque grills. Most platforms used for this purpose are physically attached to the supported structure and are not designed to be collapsible.

For some applications, it is desirable for the platform to provide open space beneath the pivot point for additional storage. Current collapsible platform designs use a long pivot structure in order to provide strength for the overall platform. However, using a long pivot structure greatly diminishes the amount of available storage space beneath the pivot. There is a need for a collapsible platform that provides a large amount of open space beneath the pivot point while being strong and stable enough to safely support a heavy object.

SUMMARY OF THE INVENTION

A three-legged platform that is secured at a short pivot point, enabling the assembly to collapse flat for easy storage and transport while also providing a large amount of open space beneath the pivot point.

BRIEF DESCRIPTION OF THE SEVERAL VIEWS OF THE DRAWINGS

The accompanying drawings illustrate various exemplary implementations and are part of the specification. The illustrated implementations are proffered for purpose of example, not for purpose of limitation.

FIG. 2a depicts a side view of a first leg of the collapsible three-legged platform, as shown and described herein.

FIG. 2b depicts a side view of a second leg of the collapsible three-legged platform, as shown and described herein.

FIG. 2c depicts a side view of a third leg of the collapsible three-legged platform, as shown and described herein.

DETAILED DESCRIPTION OF THE INVENTION

Figure 1:
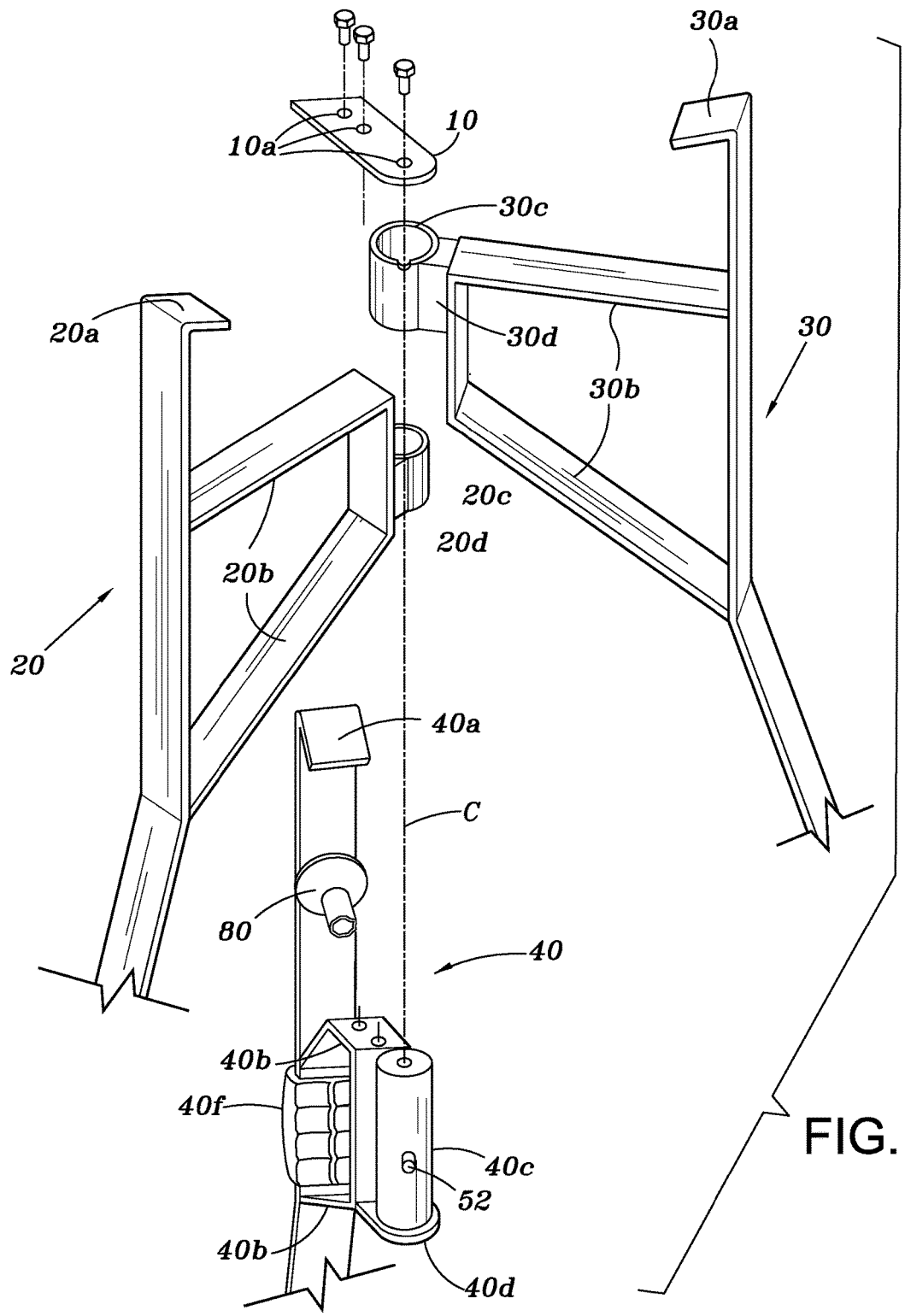
FIG. 1 depicts a perspective exploded view of the collapsible three-legged platform, as shown and described herein.

The collapsible three-legged platform, also referred to herein as "platform," will be more fully understood and appreciated by reading the following Detailed Description in conjunction with the accompanying drawings, wherein like reference numerals refer to like components.

FIG. 1 depicts a perspective exploded view of the collapsible three-legged platform. The collapsible three-legged platform includes three or more legs (three are shown, leg 20, leg 30, leg 40). Each leg 20, 30, 40 can include one or more arms 20b, 30b, and 40b; one or more extension elements 20d, 30d, 40d; one or more support lips 20a, 30a, 40a; or a combination thereof. A handle 40f can be disposed on one or more of the legs. The legs should be made from a strong material, preferably metal, such that they can support a significant amount of weight without deforming or breaking. In at least one embodiment, each arm is a trapezoidal shape, providing additional strength to the arm.

The top of each leg 20, 30, and 40 can be bent at an acute angle to provide a support lip 20a, 30a, and 40a, such that the legs can support a lower surface of an object. The support lips 20a, 30a, and 40a can be angled in such a way to provide support to a plurality of objects that may be suited to place on top of the platform. For example, the support lips 20a, 30a, and 40a may be bent to support a lower flat surface of pan or wok.

Referring to FIGS. 1 and 2a, leg 20 can include an arm 20b that extends outward and can form a loop to provide structural support. An extension element 20d can extend from the distal end of the arm 20b and a cylindrical sleeve 20c can extend from the extension element 20d. The cylindrical sleeve 20c can be hollow or otherwise configured to attached to one or more other cylindrical sleeves and pivot post extending from another leg (two are shown; 30, 40).

Referring to FIGS. 1 and 2b, leg 30 can include an arm 30b that extends outward and can form a loop to provide structural support. An extension element 30d can extend from the distal end of the arm 30b and a cylindrical sleeve 30c can extend from the extension element 30d. The cylindrical sleeve 30c can be hollow or otherwise configured to attached to one or more other cylindrical sleeves and pivot post extending from another leg (two are shown; 20, 40).

Referring to FIGS. 1 and 2c, leg 40 can include an arm 40b that extends outward and can form a loop to provide structural support. An extension element 40d can extend from the arm 40b. As shown, the extension element 40d can be relatively flat and can extend from the arm 40b at a position near the bottom of the arm 40b. A central pivot post 40c can extend upward from the extension element 40d. In one or more embodiments, one or more of the extension elements 20d, 30d, 40d can be absent.

Referring to FIG. 2c, an upper capping member 10 can be secured to a top portion of the arm 40b. The upper capping member 10 can extend out over the top of the central pivot post 40c. In an alternative embodiment, the pivot post 40c can extend downward from the extension element 40d and the upper capping member 10 can be secured to a bottom portion of the arm 40b. However arranged, it is important that the cylindrical sleeves 20c, 30c are not allowed to freely slide off of the central pivot post 40c; this can be accomplished by appropriately using one or more capping members 10.

In at least on embodiment, one or more holes 10a can be disposed through the upper capping member 10 so that an attachment means or mechanism (including: glue, nails, screws 12a and 12b, other attaching hardware known to one in the art) can attach or otherwise secure the upper capping member 10 to the arm 40b. Together, the cylindrical sleeves 20c and 30c, and the central pivot post 40c form a central pivot axis C for the collapsible platform.

Fuel line attachment 80 can be disposed on any one of the legs, but is shown on leg 40. The fuel line attachment 80 can be configured to supply gas or other fuel to a burner (not shown) disposed about the center of the platform and above the central pivot post 40c. In at least one embodiment, the burner can be mounted to the platform by a central screw 12c securing it to a hole disposed in the upper capping member 10. More specifically, the burner can be disposed centrally over the pivot assembly so that it can provide heat to any cooking surface disposed on the platform. A fuel line 82 can run through the fuel line attachment 80 and to a fuel source 84. One such fuel source 84 can include a tank of propane gas, where the pressurized propane gas is controlled by a regulator and directed to the burner through the fuel line 82. In an alternative embodiment, the fuel source could contain gasoline, camping fuel, white fuel, or any fuel capable of providing a flame at the burner. Though not shown, the burner can include any burner capable of providing a flame, though a flame appropriate for providing heat to a cooking surface would be most appropriate when the platform is used as a cooking platform.

As is commonly known, a user may initiate a supply of fuel from the fuel source 84, through the fuel lines 82, and to the burner. The user can then ignite the fuel to provide a flame.

Figure 3:
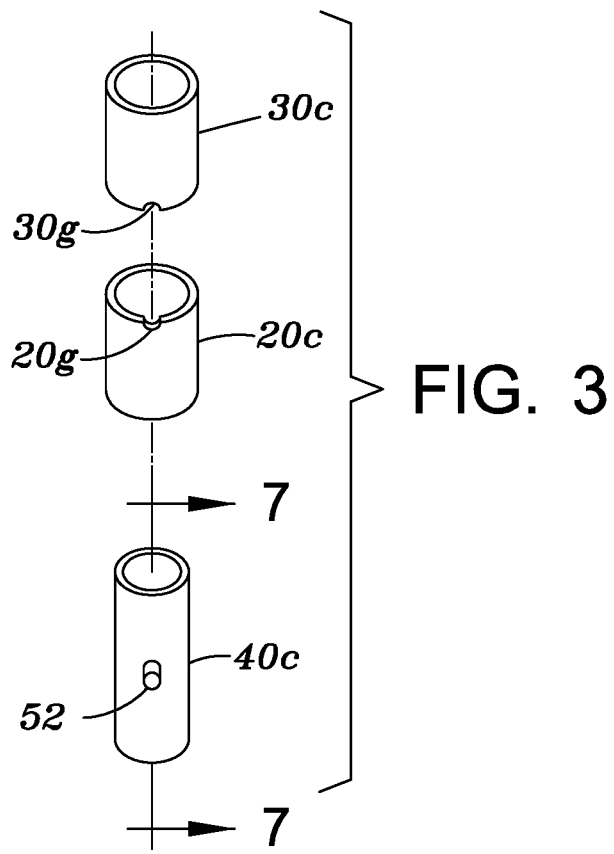
FIG. 3 depicts a disassembled view of the pivot components, as shown and described herein.
Figure 4:
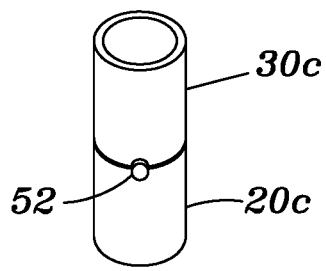
FIG. 4 depicts an assembled view of the pivot components, as shown and described herein.

The cylindrical sleeve 20c, cylindrical sleeve 30c, and the central pivot post 40c can be collectively referred to as the "pivot components." As shown in FIGS. 3 and 4, the central pivot post 40c can be generally cylindrical and appropriately sized or otherwise configured to slideably connect to, or fit inside of, cylinder sleeves 20c and 30c. In an alternative embodiment, the central pivot post 40c and cylindrical sleeves 20c and 30c can have a shape that can be defined as a rectangular prism, triangular prism, hexagonal, etc., such that the central pivot post 40c fits firmly inside of cylindrical sleeves 20c and 30c. In an alternative embodiment, the cylindrical sleeves 20c and 30c can be configured to fit on the outside of the central pivot post 40c. Additionally, the outer surface of the central pivot post 40c should touch or nearly touch the interior surface of the cylindrical sleeves 20c and 30c so that, when assembled, the central pivot post 40c and cylindrical sleeves 20c and 30c provide stability to the platform. Extension member 40d can be larger than the central pivot post 40c to prevent sleeves 20c and 30c from sliding off the bottom end of the central pivot post 40c. In other words, the extension member 40d can function as a lower capping member.

Figure 5:
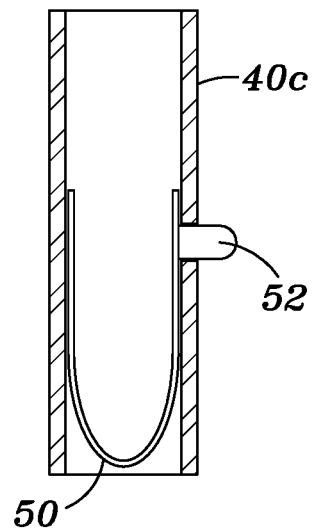
FIG. 5 depicts a cross sectional view of the central pivot post having a spring disposed therein, as shown and described herein.

Cylindrical sleeve 30c can have a notch 30g disposed about its bottom rim and cylindrical sleeve 20c can have a notch 20g disposed about its top rim. The two notches 20g, 30g can be disposed in their respective cylindrical sleeves 20c, 30c so that they line up with one another to form a hole through which a button 52 can fit through. As shown, the notches 20g, 30g form a circular hole, but in alternative embodiments the hole can be any shape. As shown in FIG. 5, the spring button 52 can extend from a spring 50 disposed within the internal volume of the central pivot post 40c. When assembled, the spring button 52 can extend through a hole in the sidewall of the central pivot post 40c and through the hole formed by the notches 20g, 30g disposed in the cylindrical sleeves 20c, 30c. The button 52 will prevent cylindrical sleeve 20c, cylindrical sleeve 30c, and the central pivot post 40c from rotating about the central axis independent of one another. In other words, when fully assembled, the spring pin button 52 and the notches 30g and 20g form a locking mechanism that restrains cylindrical sleeve 30c and cylindrical sleeve 20c from rotating about central pivot post 40c, However, when the button 52 is pushed in, and is no longer engaging the notches 20g and 30g, then the cylindrical sleeves 20c and 30c can rotate independently of each other, and independently of the central pivot post 40c, allowing the platform to collapse. In other words, when the spring pin button 52 is depressed, cylindrical sleeve 30c and cylindrical sleeve 20c can rotate freely about the central pivot post 40c.

Figure 6:
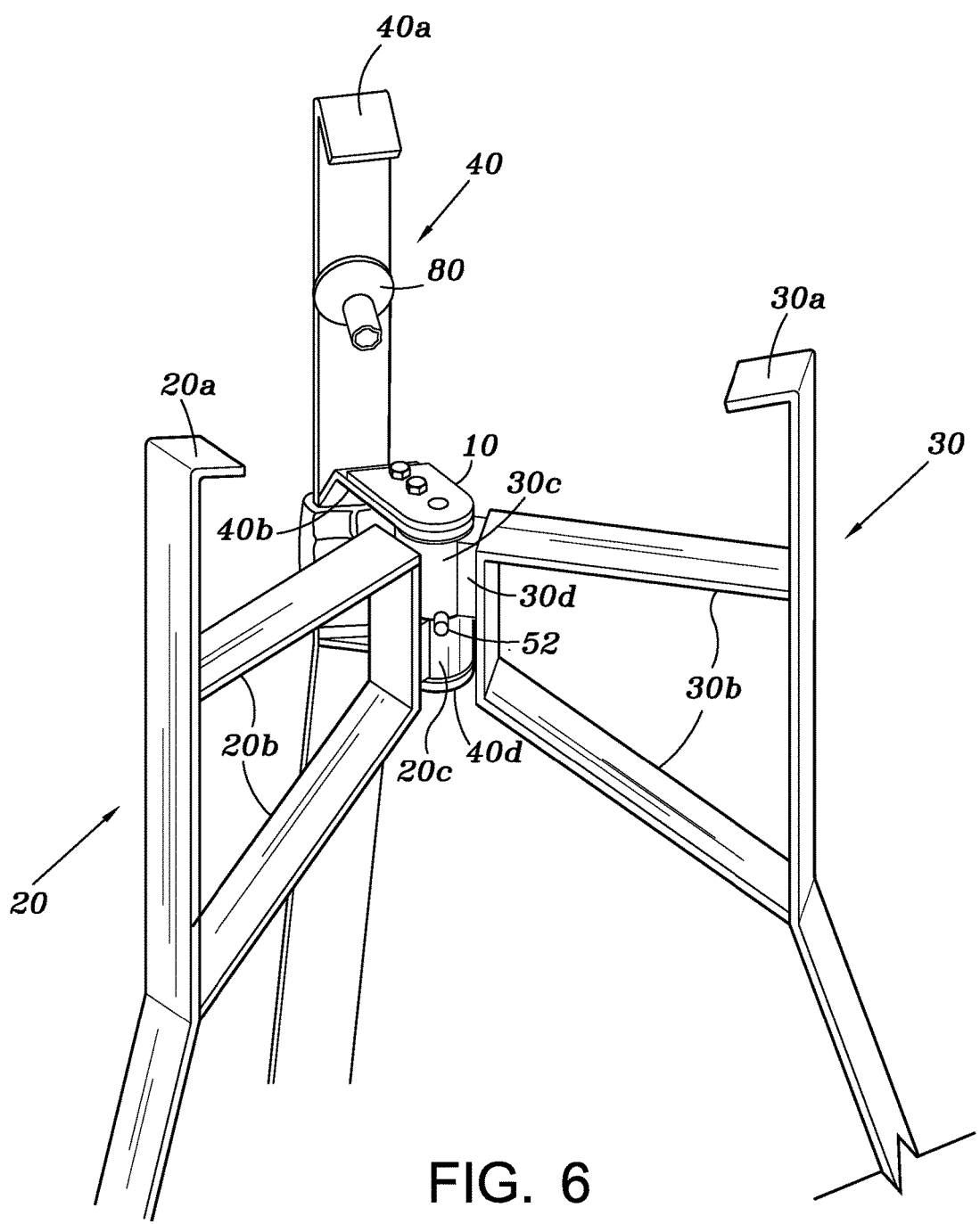
FIG. 6 depicts a perspective view of an assembled collapsible three-legged platform, as shown and described herein.

FIG. 6 depicts a perspective view of the assembled collapsible three-legged platform in the open position. During assembly, the cylindrical sleeve 20c of leg 20 can first slide onto the central pivot post 40c of leg 40 and come to rest on the extension element 40d. Next, the cylindrical sleeve 30c of leg 30 can slide onto the central pivot post 40c, coming to rest on the cylindrical sleeve 20c. Next, upper capping member 10 can be secured to the arm 40b of leg 40 such that at least a portion of the upper capping member extends over the cylindrical sleeve 30c to prevent the cylindrical sleeves 20c and 30c from sliding off of the central pivot post 40c. The upper capping member 10 thereby holds the assembly in place, preventing the three legs 20, 30, 40 from coming apart. However, the upper capping member 10 should not contact the cylindrical sleeve 30c in such a way that would prevent the cylindrical sleeves 20c and 30c and the central pivot post 40c from rotating about the central axis C in relation to one another.

Figure 7:
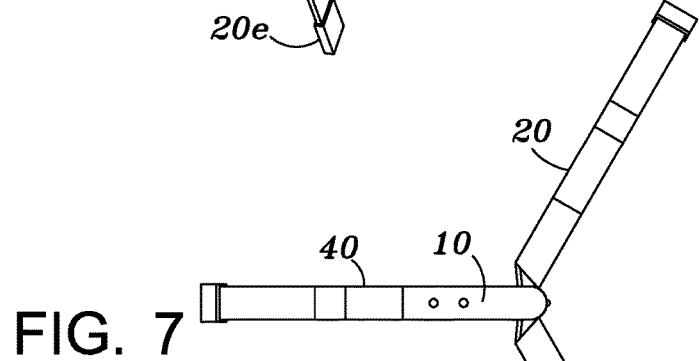
FIG. 7 depicts a top-side plain view of the collapsible three-legged platform in the "opened" position, as shown and described herein.
Figure 8:
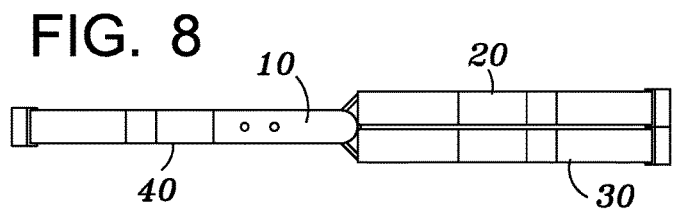
FIG. 8 depicts a top-side plain view of the collapsible three-legged platform in the "collapsed" position, as shown and described herein.

FIG. 7 depicts a top-side plain view of the collapsible three-legged platform in the "opened" position, and FIG. 8 depict a top-side plain view of the collapsible three-legged platform in the "collapsed" or "closed" position. In the open position, the three legs 20, 30, 40 are stable when positioned 120 degrees from one another. The legs are locked in this configuration when the button 52 is disposed through the hole created by the hole in the central pivot post 40c lined up with the notches 20g, 30g disposed on the cylindrical sleeves 20g, 30g and discussed above in reference to FIGS. 3 and 4. When the button 52 is disposed through the hole, the legs 20, 30, 40 are prevented from rotating about the central axis C independently of one another. To collapse the platform, the button 52 can be pushed, pulled or otherwise removed from the hole, thereby allowing the legs 20, 30, 40 to freely rotate about the central axis C independently of one another. In one or more embodiments, the platform can be collapsed and carried by the handle 40f disposed on one of the legs 20, 30, 40. As shown, the handle 40f can be disposed on the leg 40, so that a user can remove the button 52 from the hole and lift the platform by the handle 40f. When this is done, legs 20 and 30 will rotate downward and toward each other to form a flattened, "collapsed" platform which is easy to carry and store for later use.

Figure 9:
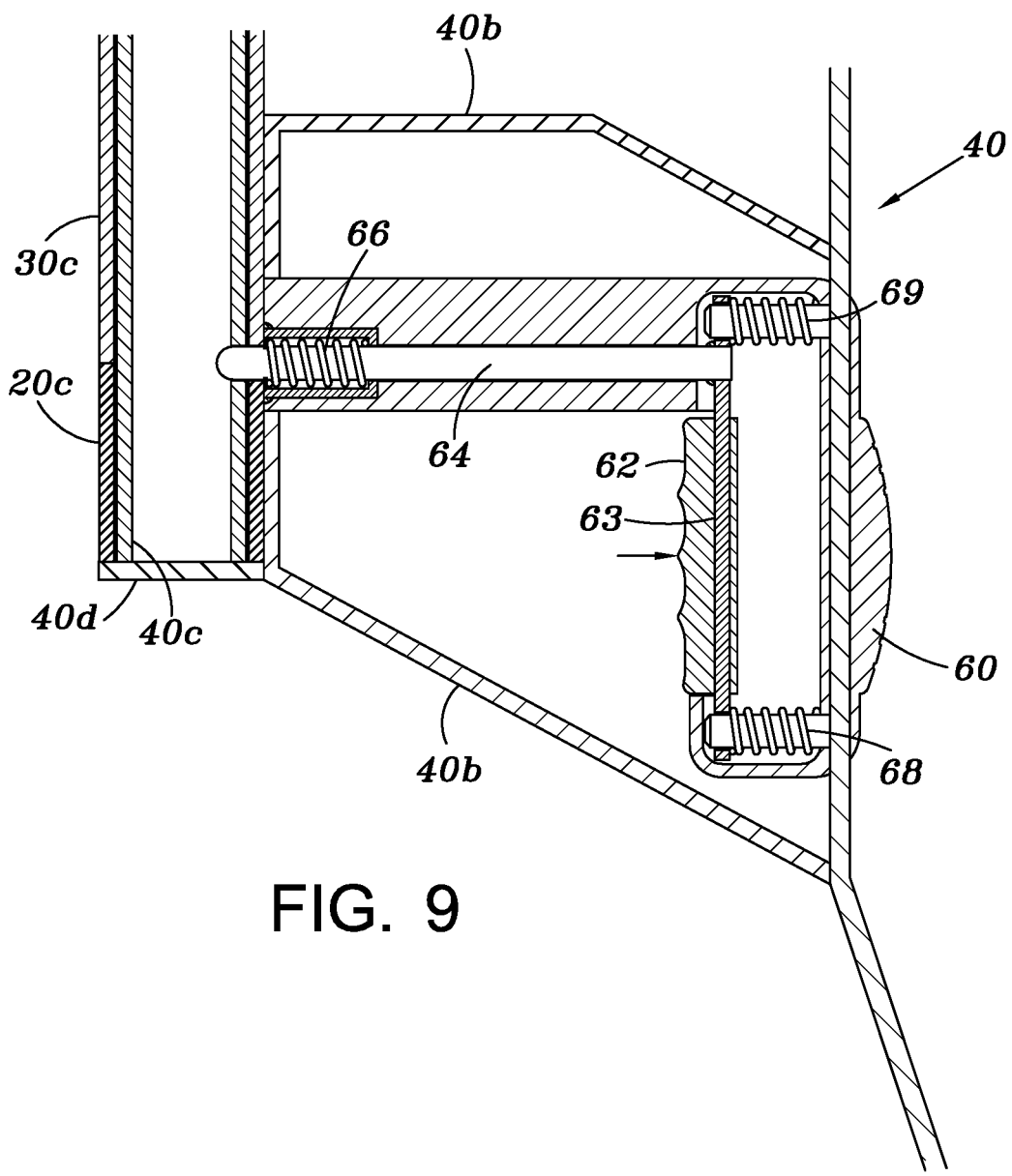
FIG. 9 depicts a release mechanism, as shown and described herein.

FIG. 9 depicts a release mechanism. This release mechanism can replace the spring 50 and button 52 discussed above in reference to FIG. 3. The release mechanism can include a handle 60, a finger grip 62, a support bar 63, one or more springs (three are shown, 66, 68, 69), a stop bar 64, or any combination thereof. For convenience of describing the invention, the stop bar 64 may also be referred to from here on as a "button." The handle 60 can be mounted to the leg 40 and positioned so that when a user grabs the handle 60, the leg 40 provides structural support. The palm grip of the handle 60 can be on the exterior of the leg 40 and the support bar 63 can be on the interior of the leg 40 and generally disposed between the arms 40b. The support bar can connect to a first distal end of the stop bar 64. The stop bar 64 can extend to the central pivot members such that a second distal end of the stop bar 64 is disposed through the hole in the central pivot post 40c and notches 20g, and 30g when the platform is in the open position. When disposed through these holes, the stop bar 64 prevents the legs 20, 30, 40 from rotating independently of each other, similar to the button 52 discuss above.

The one or more springs 66, 68, 69 can provide the appropriate forward force to keep the stop bar 64 inserted into the holes when the legs 20, 30, 40 are in the open position. To collapse the platform, the stop bar 64 can be removed from the holes by compressing the springs 66, 68, 69, which can be accomplished by a user pulling back the support bar 63. The handle 60 can generally extend toward the interior of the platform so that a user can grab the handle and use her finger to pull the support bar 63 by squeezing her hand together. The support bar 63 can be disposed within the finger grip 62 and configured to provide comfort to the user. The handle 40f, 60 may be made of rubber or similar material and molded such that it provides an optimum surface for gripping the collapsible three-legged platform.

Figure 10:
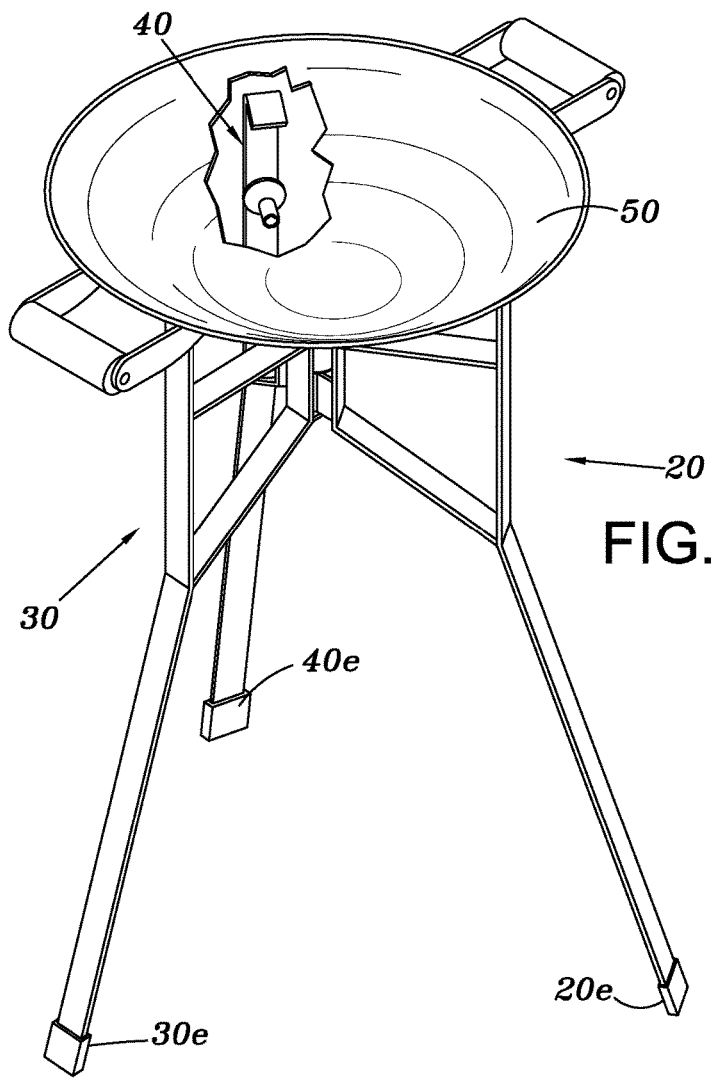
FIG. 10 depicts a perspective view of the collapsible three-legged platform having a wok disposed thereon, as shown and described herein.

FIG. 10 depicts a perspective view of the collapsible three-legged platform having a wok 50 disposed thereon. In an alternative embodiment, a pan, pot, or other cooking apparatus may be positioned in the tops of the legs 20, 30, 40 to provide a cooking surface. In at least one embodiment, the center of the cooking surface is aligned about the central axis C of the platform and in line with the burner. As such, the flame from the burner can provide the highest heat to the center of the cooking surface. High friction feet 20e, 30e, 40e may be attached to the bottom of legs 20, 30 and 40 respectively such that they provide a flat surface or additional friction against the supporting surface.

The platform can be assembled as shown in FIG. 10 for cooking. To quickly collapse the platform, a user can remove the cooking surface 50, release the button 52, 64, and lift upward on the handle 40f, 60. The collapsed platform can then be carried and stored. To use the platform again, a user need only put the collapsed platform in the upright position and maneuver the legs 20, 30, 40 into the correct position, as shown. Once the holes are formed and aligned by the notches 20g, 30g in the cylindrical sleeves 20c, 30c and the central pivot post 40c, the spring-loaded button 52, 64 will "pop" into place as the spring(s) 50, 66, 68, 69 will force the button 52, 64 through the holes.

The collapsible three-legged platform disclosed herein is particularly suited for supporting a grill having a spherical lower surface, similar to a wok. The bottom portion of the legs may be adapted to be extended to provide additional space beneath the central pivot post.

Although the present invention has been described with respect to specific details, it is not intended that such details be regarded as limitations on the scope of the invention, except to the extent that they are included in the accompanying claims. It will thus be appreciated that those skilled in the art will be able to devise numerous alternative arrangements that, while not shown or described herein, embody the principles of the invention and thus are within its spirit and scope.

We claim:

1. A collapsible platform assembly, comprising:
a first leg having an arm perpendicularly attached thereto, the arm having attached thereto a lower capping member and a central pivot post, the central pivot post having an opening and a spring-loaded button therethrough;
a second leg having an arm perpendicularly attached thereto, the arm having attached thereto an extension element and a first sleeve, the first sleeve having a notch in an upper surface and being adapted to be placed over the central pivot post;
a third leg having an arm perpendicularly attached thereto, the arm having attached thereto an extension element and a second sleeve, the second sleeve having a notch in a lower surface and being adapted to be placed over the central pivot post; and
an upper capping member attached to the arm of the first leg and disposed over the second sleeve.

2. A collapsible platform assembly, comprising:
a first leg having an arm perpendicularly attached thereto, the arm having attached thereto a lower capping member and a central pivot post, the central pivot post having an opening and a spring-loaded button therethrough;
a second leg having an arm perpendicularly attached thereto, the arm having attached thereto an extension element and a first sleeve placed over the central pivot post, the first sleeve having a notch in an upper surface;
a third leg having an arm perpendicularly attached thereto, the arm having attached thereto an extension element and a second sleeve placed over the central pivot post, the second sleeve having a notch in a lower surface; and
an upper capping member attached to the arm of the first leg and disposed over the second sleeve to prevent the first and second sleeve from sliding off the central pivot post.

3. A collapsible platform assembly, comprising:
a first leg having an arm perpendicularly attached thereto, the arm having attached thereto a lower capping member and a central pivot post having a first hole;
a second leg having an arm perpendicularly attached thereto, the arm having attached thereto an extension element and a first sleeve placed over the central pivot post, the first sleeve having a notch in an upper surface;
a third leg having an arm perpendicularly attached thereto, the arm having attached thereto an extension element and a second sleeve placed over the central pivot post, the second sleeve having a notch in a lower surface, wherein the notches align to form a second hole; and
an upper capping member attached to the arm of the first leg and disposed over the second sleeve to prevent the first and second sleeve from sliding off the central pivot post;

a release mechanism attached to the first leg, the release mechanism having a spring-loaded stop bar extending into the first and second hole.

\* \* \* \* \*